(12) United States Patent
Steinke

(10) Patent No.: US 12,079,170 B2
(45) Date of Patent: Sep. 3, 2024

(54) FACILITATING CHECKPOINT LOCKS FOR DISTRIBUTED SYSTEMS

(71) Applicant: EMC IP Holding Company LLC, Hopkinton, MA (US)

(72) Inventor: Ronald Steinke, Tacoma, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 22 days.

(21) Appl. No.: 17/810,738

(22) Filed: Jul. 5, 2022

(65) Prior Publication Data
US 2022/0342854 A1 Oct. 27, 2022

Related U.S. Application Data

(62) Division of application No. 16/392,115, filed on Apr. 23, 2019, now Pat. No. 11,416,453.

(51) Int. Cl.
| | |
|---|---|
| *G06F 7/00* | (2006.01) |
| *G06F 16/13* | (2019.01) |
| *G06F 16/176* | (2019.01) |
| *G06F 16/182* | (2019.01) |
| *G06F 17/00* | (2019.01) |

(52) U.S. Cl.
CPC .......... *G06F 16/1774* (2019.01); *G06F 16/13* (2019.01); *G06F 16/182* (2019.01)

(58) Field of Classification Search
None
See application file for complete search history.

(56) References Cited

U.S. PATENT DOCUMENTS

| | | | |
|---|---|---|---|
| 2008/0033958 A1 | 2/2008 | Richards et al. | |
| 2010/0023521 A1* | 1/2010 | Arcese | G06F 16/2343 707/E17.007 |
| 2011/0307449 A1 | 12/2011 | Cargille et al. | |
| 2013/0290583 A1* | 10/2013 | Dice | G06F 9/526 710/200 |

(Continued)

OTHER PUBLICATIONS

Non-Final Office Action received for U.S. Appl. No. 16/392,115 dated Jun. 23, 2021, 28 pages.

(Continued)

*Primary Examiner* — Tuan A Pham
(74) *Attorney, Agent, or Firm* — Amin, Turocy & Watson, LLP

(57) ABSTRACT

Facilitating checkpoint locks for distributed systems is provided herein. A system can comprise a processor and a memory that stores executable instructions that, when executed by the processor, facilitate performance of operations. The operations can comprise generating an ordered data structure that comprises respective identifications of a group of nodes granted a shared lock for a data file. The group of nodes can comprise a node having a respective identification of the respective identifications. The operations also can comprise, based on a determination that a checkpoint function associated with the shared lock has completed at a node of the group of nodes, removing the respective identification of the node from the ordered data structure. In an example, the shared lock can be a checkpoint application program interface. In another example, the group of nodes can be nodes arranged in a distributed computing hierarchy.

20 Claims, 11 Drawing Sheets

(56) References Cited

U.S. PATENT DOCUMENTS

| | | | |
|---|---|---|---|
| 2013/0290967 A1 | 10/2013 | Calciu et al. | |
| 2016/0154817 A1* | 6/2016 | Mason, Jr. | G06F 16/1827 707/704 |
| 2017/0329541 A1 | 11/2017 | Hayasaka et al. | |

OTHER PUBLICATIONS

Final Office Action received for U.S. Appl. No. 16/392,115 dated Jan. 5, 2022, 27 pages.

* cited by examiner

FACILITATING CHECKPOINT LOCKS FOR DISTRIBUTED SYSTEMS

RELATED APPLICATION

The subject patent application is a divisional of, and claims priority to, U.S. patent application Ser. No. 16/392, 115, filed Apr. 23, 2019, and entitled "FACILITATING CHECKPOINT LOCKS FOR DISTRIBUTED SYSTEMS," the entirety of which priority application is hereby incorporated by reference herein.

TECHNICAL FIELD

The subject disclosure relates generally to distributed file systems. More specifically, the subject disclosure relates to managing lock resources in distributed file systems.

BACKGROUND

Distributed storage systems and/or object storage systems can provide a wide range of storage services while achieving high scalability, availability, and serviceability. An example of such storage systems is referred to as ECS, which uses the latest trends in software architecture and development to achieve the above noted services, as well as other services.

Operations of distributed storage systems and/or object storage systems can include a locking mechanism to maintain data consistency of the associated shared files. For example, shared and exclusive acquisition of a lock, where there can be multiple shared owners simultaneously, can be utilized as a pattern for the locking mechanism. However, this pattern can be costly for a distributed system with thousands of shared lockers, as a single thread taking an exclusive lock anywhere in the system can bring all shared lock requests to a halt until all existing shared owners release their locks.

The above-described context with respect to conventional storage systems is merely intended to provide an overview of current technology, and is not intended to be exhaustive. Other contextual description, and corresponding benefits of some of the various non-limiting embodiments described herein, can become further apparent upon review of the following detailed description.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an embodiment, provided herein is a method that can comprise generating, by a device comprising a processor, a data structure that comprises respective identities of a group of nodes. The group of nodes can be granted respective shared locks for access to a data file. The method also can comprise removing, by the device, a first identity from the identities of the group of nodes in the data structure. The first identity can be associated with a first node of the group of nodes. Further, removing the first identity can be based on receipt of a notice from the first node that a checkpoint function associated with a shared lock of the respective shared locks has completed at the first node. In some implementations, the respective shared locks can comprise respective checkpoint application program interfaces. According to some implementations, the group of nodes can be nodes of a distributed computing environment.

The method can comprise, according to some implementations, blocking, by the device, the group of nodes from accessing the data file until respective notices are received from the group of nodes that respective checkpoint functions associated with the respective shared locks have completed at respective nodes of the group of nodes. Further to these implementations, the method can comprise allowing, by the device, a second group of nodes access to the data file based on receipt of respective requests from the second group of nodes for second respective shared locks.

According to some implementations, prior to removing the first identity, the method can comprise sending, by the device, respective messages to respective nodes in the group of nodes. The respective messages can comprise a checkpoint call related to completion of the checkpoint function. Further to these implementations, the method can comprise sending, by the device, second messages to the respective nodes in the group of nodes, other than the first node. Further, the method can comprise removing, by the device, a second identity from the identities of the group of nodes in the data structure. The second identity can be associated with a second node of the group of nodes. Further, removing the second identity can be based on receipt of a second notice from the second node that a second checkpoint function associated with the shared lock has completed at the second node.

Another embodiment relates to a system that can comprise a processor and a memory that stores executable instructions that, when executed by the processor, facilitate performance of operations. The operations can comprise generating an ordered data structure that comprises respective identifications of a group of nodes granted a shared lock for a data file. The group of nodes can comprise a node having a respective identification of the respective identifications. The operations also can comprise, based on a determination that a checkpoint function associated with the shared lock has completed at a node of the group of nodes, removing the respective identification of the node from the ordered data structure. In an example, the shared lock can be a checkpoint application program interface. In another example, the group of nodes can be nodes arranged in a distributed computing hierarchy.

According to some implementations, the respective identification of the node can be a first identification of a first node, the respective identifications of the group of nodes further can comprise a second identification of a second node of the group of nodes, and a third identification of a third node of the group of nodes. Further to these implementations, the operations can comprise determining that the first identification, the second identification, and the third identification have been removed from the ordered data structure. In addition, the operations can comprise removing the ordered data structure from a group of ordered data structures, wherein the group of ordered data structures are utilized to track shared locks between checkpoint calls.

In accordance with some implementations, the operations can comprise facilitating access to the data file for a second group of nodes comprising second nodes based on receipt of respective shared lock requests from the second nodes. Further to these implementations, the respective shared lock requests from the second nodes do not block completion of a checkpoint call associated with the first group of nodes.

According to some implementations, the operations can comprise sending a first checkpoint function call to a second node of the group of nodes and at least a third node of the group of nodes. Further, the operations can comprise, based on a second determination that a second checkpoint function associated with the shared lock has completed at the second node of the group of nodes, removing a second identification of the second node from the ordered data structure.

Further to the above implementations, the operations can comprise sending a second checkpoint function call to the third node. Further, based on a third determination that a third checkpoint function associated with the shared lock has completed at the third node of the group of nodes, the operations can comprise rendering the ordered data structure as an empty data structure based on removing a third identification of the third node from the ordered data structure.

Another embodiment relates to a computer-readable storage medium comprising instructions that, in response to execution, cause a system comprising a processor to perform operations. The operations can comprise retaining a listing that comprises respective identifications of a group of nodes that acquired respective shared locks for a data file. The operations also can comprise receiving, from a first node of the group of nodes, a reply to a checkpoint call sent to the group of nodes. Further, the operations can comprise removing a first identification of the first node from the respective identifications in the listing based on the reply from the first node, wherein the reply indicates that a checkpoint function associated with a shared lock of the respective shared locks has completed at the first node. The respective shared locks can comprise respective checkpoint application program interfaces.

According to some implementations, the operations can comprise tracking a second group of nodes that acquired respective second shared locks for the data file. Further, the operations can comprise sending to the first group of nodes, excluding the first node, and the second group of nodes, a second checkpoint call.

In accordance with some implementations, the operations can comprise, prior to receiving the reply, starting a counter associated with the checkpoint call. The counter can identify a quantity of nodes in the group of nodes. Further, removing the first identification of the first node can comprise decreasing the quantity of nodes by one digit.

Further to these implementations, the operations can comprise determining that the counter has reached zero. The operations also can comprise removing the counter from a listing of counters and marking the checkpoint function as complete.

To the accomplishment of the foregoing and related ends, the disclosed subject matter comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description can include additional or alternative embodiments beyond those described in this summary.

BRIEF DESCRIPTION OF THE DRAWINGS

Various non-limiting embodiments are further described with reference to the accompanying drawings in which.

DETAILED DESCRIPTION

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

Distributed file systems (e.g., distributed architectures) can include multiple processing nodes (e.g., storage servers) that can serve data to client applications executing on one or more client devices. For example, a distributed file system can be a system that is distributed across multiple nodes in a group of nodes. An individual node can include one or more storage drives that can store data that is accessible by the one or more client devices. The one or more client devices can interact with, and request operations on, files stored in the one or more storage devices. Thus, in some cases, there can be operations that are executed by multiple threads, processes, and/or applications distributed across the one or more nodes. In an example, two or more threads could request to concurrently write data to the same file in a file system.

Figure 1:
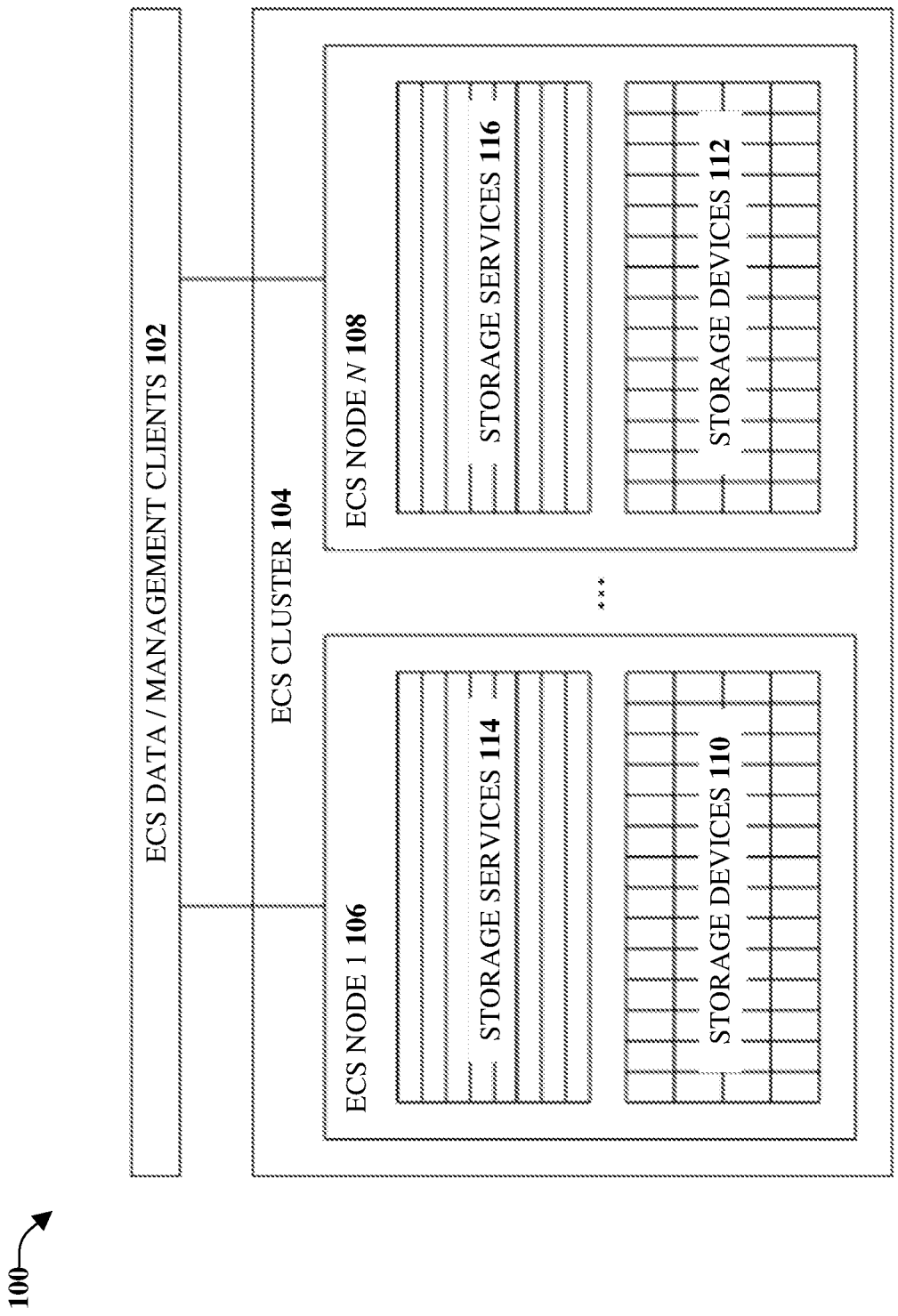
FIG. 1 illustrates an example, non-limiting, cluster architecture for storage devices in accordance with one or more embodiments described herein.

For example, FIG. 1 illustrates an example, non-limiting, cluster architecture 100 for storage devices in accordance with one or more embodiments described herein. The cluster architecture 100 is illustrated at a high-level and can be implemented as an ECS cluster architecture, for example. However, the disclosed aspects are not limited to an ECS implementation and other data storages can be utilized.

ECS data/management clients 102 can be serviced by an ECS cluster 104 that can comprise several (N) nodes, illustrated as a first ECS Node 106 (or ECS Node 1) through an Nth ECS Node 108 (or ECS Node N), where N is an integer. The nodes (e.g., the first ECS Node 106 through the Nth ECS Node 108) can manage several storage devices (e.g., hard drives), illustrated as a first set of storage devices 110 and a Nth set of storage devices 112. It is noted that a single ECS node can manage from around fifteen to about one hundred and twenty storage devices, for example.

The ECS nodes (e.g., the first ECS Node 106, the Nth ECS Node 108) can run a number of storage services, illustrated as first storage services 114 through an Nth storage services 116. A single node that runs ECS can manage about twenty (or more) independent services. For example, these services can be a blob service, a chunk management service, a storage server management service, and a shared memory service. However, other services could also be provided.

Locks (e.g., file system locks) can be used to allow client devices of the ECS data/management clients 102 to access data, while preventing other client devices of the ECS data/management clients 102 from performing various operations on the data that is locked. In an example, a read lock can be utilized (e.g., by client devices that are being utilized to read the data, referred to as "readers") to prevent the file from changing while the file is being read. Since readers are not changing the file (e.g., are not writers), multiple readers can hold locks on the file, which prevent the file from being change while being read. Thus, read locks can be shared locks. Although one reader of the multiple readers might release its read lock, another read lock for another reader will continue to prevent the file from being changed, until all read locks are released.

In another example, a write lock can be utilized (e.g., by client devices that are being utilized to write to the data, referred to as "writers") so that the writer can modify the file without concern for the actions of other writers and/or readers. Write locks can be exclusive write locks. Thus, if a first writer is writing to a file, other writers need to wait until other lock holders (which can be reader and/or writers) have finished with the file and released their associated lock. Upon or after all locks are released, a writer can obtain an exclusive write lock in order to write to the file.

Thus, a traditional pattern can be shared and exclusive acquisition of a lock, where there can be multiple shared owners simultaneously. Unfortunately, even this pattern can be quite costly for a distributed system with thousands of shared lockers. This is because as a single thread taking an exclusive lock anywhere in the system will bring all shared lock requests to a halt until all existing shared owners release their locks.

Figure 2:
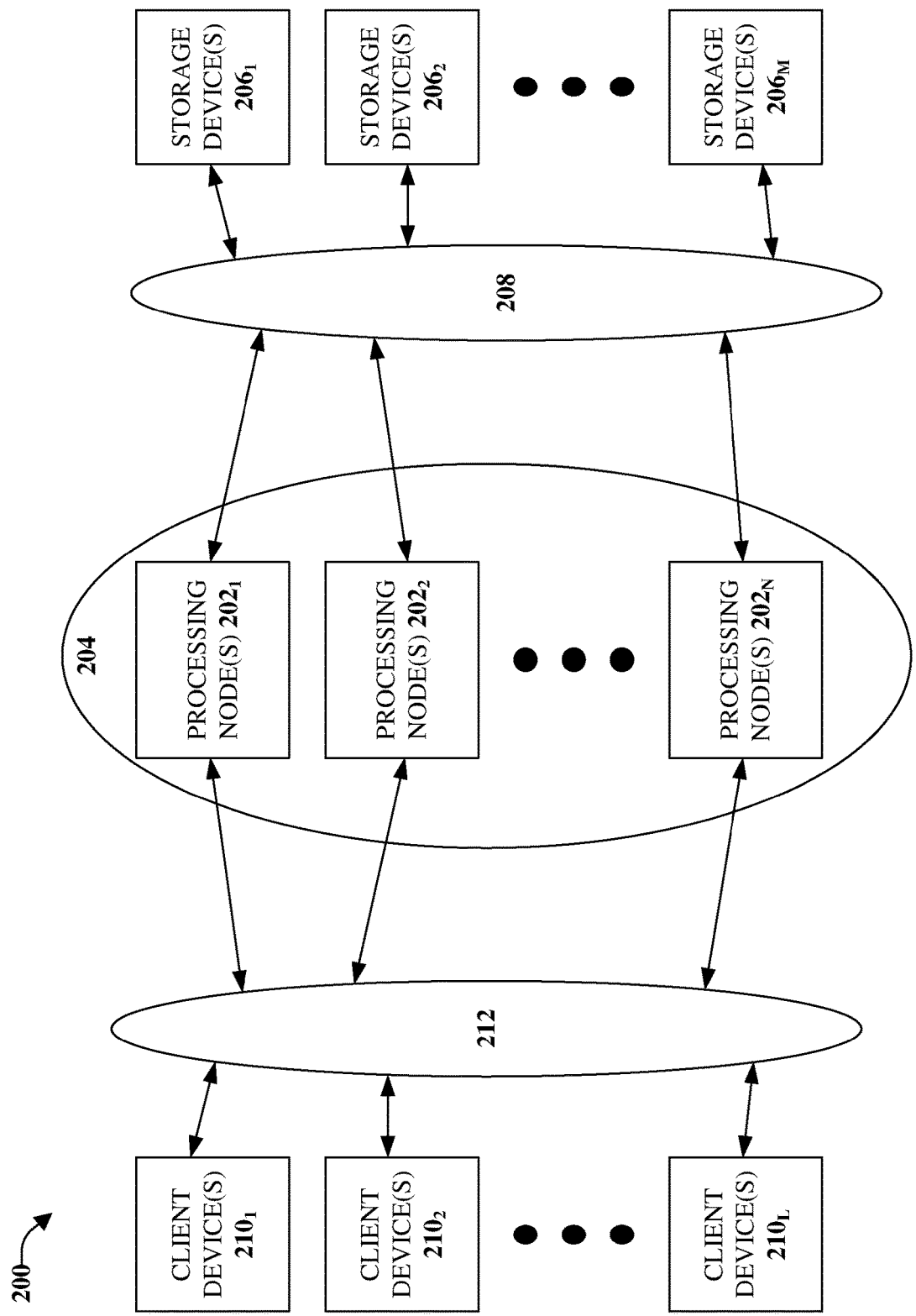
FIG. 2 illustrates an example, non-limiting, distributed architecture for storage devices in accordance with one or more embodiments described herein.

FIG. 2 illustrates an example, non-limiting, distributed architecture 200 for storage devices in accordance with one or more embodiments described herein. The distributed architecture 200 is illustrated at a high-level and can be implemented as an ECS cluster architecture, for example. However, the disclosed aspects are not limited to an ECS implementation and other data storages can be utilized with the disclosed aspects.

The distributed architecture 200 can comprise one or more processing nodes, illustrated as a first processing node $202_1$, a second processing node $202_2$, through an Nth processing node $202_N$, where N is an integer. The one or more processing nodes can be independent processing nodes (e.g., operate autonomously from one another). Further, the one or more processing nodes can communicate with one another through a network 204. The network 204 can include various types of communication networks or combinations thereof including, but not limited to, networks using protocols such as Ethernet, Internet Small Computer System Interface (iSCSI), Fibre Channel (FC), and/or wireless protocols. The network 204 can allow the one or more processing nodes to aggregate dispersed data centers into a single, unified, storage device, for example.

The distributed architecture 200 also can comprise one or more storage devices, illustrated as a first storage device $206_1$, a second storage device $206_2$, through an Mth storage device $206_M$, where M is an integer. The one or more processing nodes (e.g., the first processing node $202_1$, the second processing node $202_2$, the Nth processing node $202_N$) can be communicatively coupled to the one or more storage devices (e.g., the first storage device $206_1$, the second storage device $206_2$, the Mth storage device $206_M$) via a network 208. The network 208 can include various types of communication networks or combinations thereof including, but not limited to, networks using protocols such as Ethernet, Internet Small Computer System Interface (iSCSI), Fibre Channel (FC), and/or wireless protocols.

Further, the distributed architecture 200 also can comprise one or more client devices, illustrated as a first client device $210_1$, a second client device $210_2$, through a Lth client device $210_L$, where L is an integer. It is noted that integers N, M, and L, can be different integers, or combinations thereof can be the same integer.

The one or more processing nodes (e.g., the first processing node $202_1$, the second processing node $202_2$, the Nth processing node $202_N$) can be, or can comprise, storage services that can serve data to respective client applications of the one or more client devices (e.g., the first client device $210_1$, the second client device $210_2$, the Lth client device $210_L$). Further, the one or more processing nodes can be communicatively coupled to one or more client devices via another network 212. The one or more client devices can utilize various file sharing protocols to access data stored in the one or more storage devices.

The distributed architecture 200 can be managed through a distributed file system, which can facilitate sharing and storage of data between the one or more processing nodes. According to some implementations, the data can be stored in one or more storage devices (e.g., memories). Further, the distributed storage system can provide locking mechanisms, where only a single client device can write to a single file at any given time. For example, when the first client device $210_1$ writes to an identified file, the identified file can be locked to prevent other client devices (e.g., the second client device $210_2$, the Lth client device $210_L$) from modifying the identified file. When the first client device $210_1$ is finished and closes the identified file, the distributed storage system can inform the other client devices (e.g., the second client device $210_2$, the Lth client device $210_L$) that changes were made to the identified file. According to an example, a distributed shared/exclusive lock can be created by coordinating local exclusive locks on all nodes via messaging.

Figure 3:
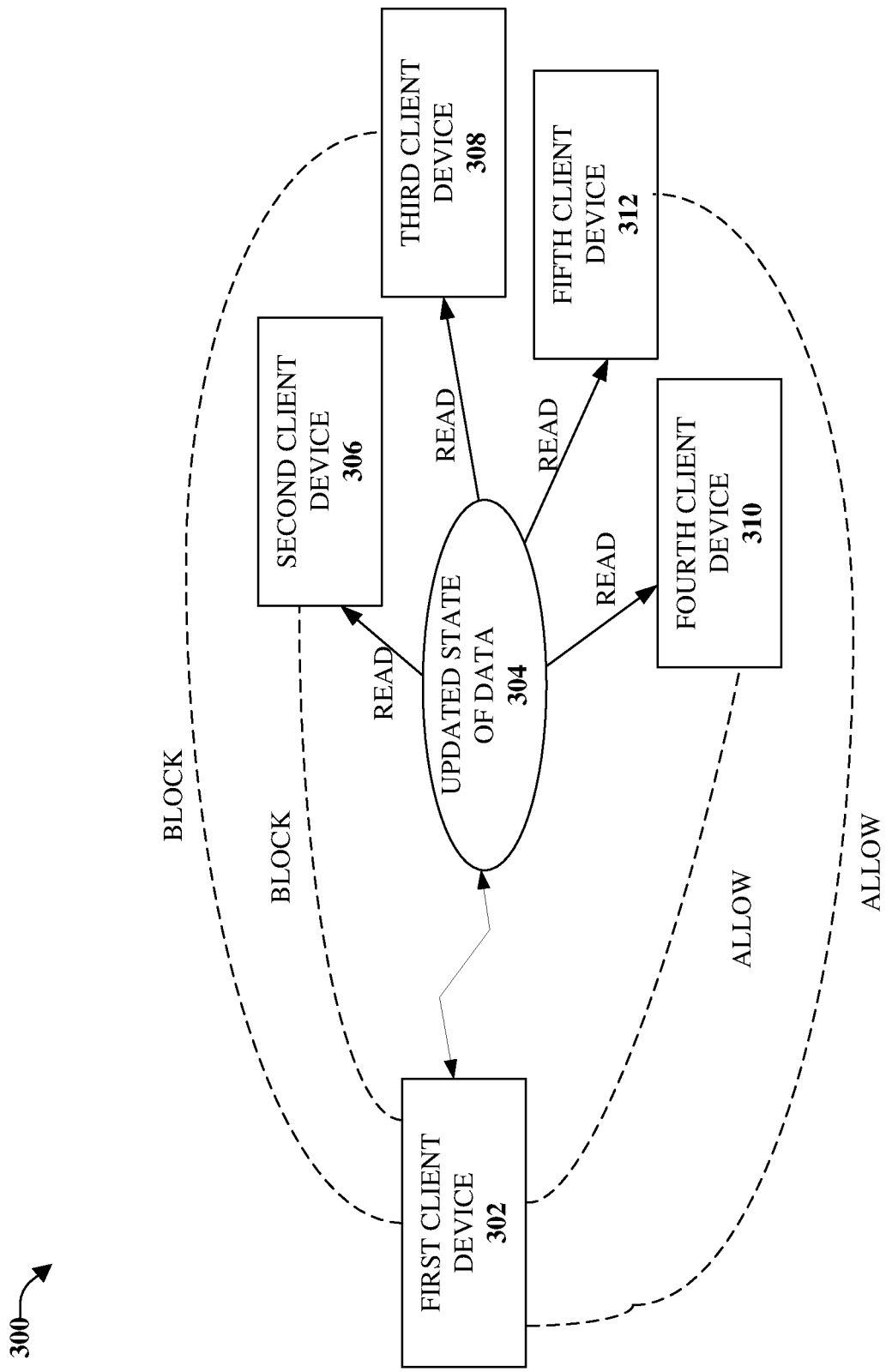
FIG. 3 illustrates an example, non-limiting, representation of a system that facilitates blocking a first group of devices while allowing access to a data file to a second group of devices in accordance with one or more embodiments described herein.

For some implementations, the full power of owning an exclusive lock is not needed. Instead, the thread taking the exclusive lock merely needs to drain existing threads with stale state. For example, the exclusive locker may have updated some state, which shared lockers read under a shared lock. The exclusive locker merely wishes to wait until all shared lockers in the system have received updated state. While the exclusive locker must block until old shared lockers exit, there is no reason not to allow new shared lock requests to complete, provided the state to be read has already been updated. For example, FIG. 3 illustrates an example, non-limiting, representation of a system 300 that facilitates blocking a first group of devices while allowing access to a data file to a second group of devices in accordance with one or more embodiments described herein.

A first client device 302 can be a device that is being utilized to change or write data. Accordingly, the first client device 302 can be considered an "exclusive locker." For example, the first client device 302 can update a state of the data, creating an updated state of data 304. Other client devices, illustrated as a second client device 306 and a third client device 308, can read the updated state of data 304. Accordingly, the second client device 306 and the third client device 308 can be referred to as shared lockers that read the updated state of the data 304 under a shared lock. Although discussed with respect to two client devices (e.g., the second client device 306, the third client device 308), there can be more than two client devices or more than two shared lockers according to the various aspects discussed herein.

In this example, the first client device 302 (e.g., the exclusive locker) merely decides to wait until all the shared lockers (e.g., the second client device 306, the third client device 308) in the system 300 have received the updated state of data 304.

In addition, there are other client devices, illustrated as a fourth client device 310 and a fifth client device 312 (although there can be more than two other client devices) that want to read the data. Thus, the other client devices (e.g., the fourth client device 310, the fifth client device 312) send new shared lock request to read the updated state of data 304.

The first client device 302 (e.g., the exclusive locker) has to block (e.g., retain the exclusive lock) until the old shared lockers (e.g., the second client device 306, the third client device 308) exit (e.g., have received the updated state of the data 304). However, according to the various aspects provided herein, the first client device 302 (e.g., the exclusive locker) can allow the new shared lock requests (from the fourth client device 310, the fifth client device 312, and so on) to complete, provided the state to be read has already been updated (e.g., the updated state of data 304). Accordingly, the thread taking the exclusive lock (e.g., the first client device 302 in this example) merely needs to drain existing threads (e.g., the second client device 306, the third client device 308) with stale state.

According to one or more implementations, an exclusive lock API can be replaced with an exclusive checkpoint API. The exclusive checkpoint API can block until all shared locks that were granted before the checkpoint call have been released (e.g., the second client device 306, the third client device 308). New shared lock requests will not be blocked, and the existence of shared lock owners that acquired their locks after the checkpoint call started (e.g., the fourth client device 310, the fifth client device 312) will not block the checkpoint call from completing.

Further, according to the various aspects discussed herein, the combination of the new lock API with a pattern where the exclusive checkpoint thread updates state (likely under a secondary, short lifetime lock) before calling the checkpoint function and shared lockers read that state under a shared lock is vastly less impactful than having the checkpoint thread take an exclusive lock. While the checkpoint thread will still block while existing shared lockers drain, the rest of the system can proceed, not blocking when it acquires new shared locks.

As discussed herein, the implementation of a checkpoint lock on a single compute node keeps a count of shared lock owners which acquired their locks between any particular pair of checkpoint calls. Each checkpoint call adds a new counter to an ordered list. When the count at the head of the list reaches zero, that counter is removed from the list, and that checkpoint function completes. Shared lockers always increment the count on the last link element during lock acquisition, and track which counter they incremented in stack memory, so they can decrement the same counter during lock release.

In addition, as discussed herein, the implementation of a checkpoint lock on a distributed system involves the checkpoint API sending a message to every node in the system. The message handler on each node calls the local checkpoint API, and responds to the message when the checkpoint completes. The shared lock implementation for a distributed system is identical to the implementation on a local system.

Figure 4:
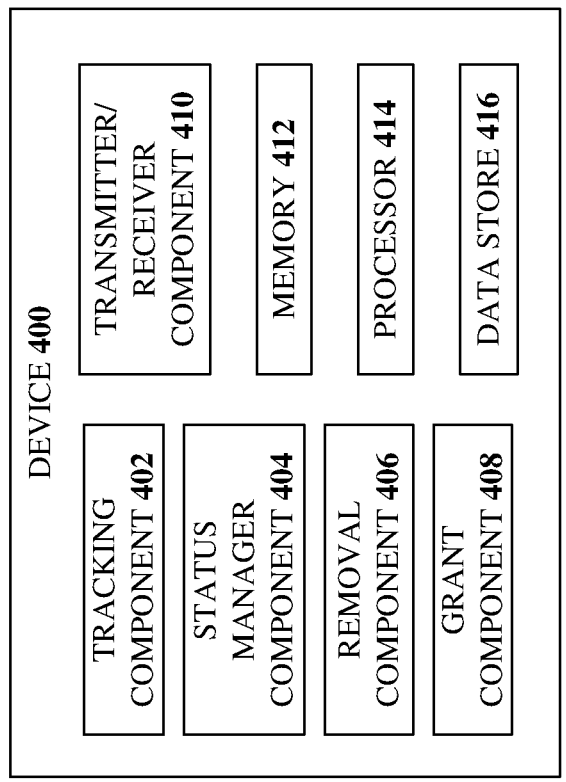
FIG. 4 illustrates an example, non-limiting, device that can facilitate checkpoint locks for distributed systems in accordance with one or more embodiments described herein.

In further detail, FIG. 4 illustrates an example, non-limiting, device 400 that can facilitate checkpoint locks for distributed systems in accordance with one or more embodiments described herein.

Aspects of devices (e.g., the device 400 and the like), apparatuses, systems, and/or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the device 400 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the device 400 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated in FIG. 4, the device 400 can include a tracking component 402, a status manager component 404, a removal component 406, a grant component 408, a transmitter/receiver component 410, at least one memory 412 at least one processor 414, and at least one data store 416.

The device 400 can process and monitor one or more locks that are active within a computing environment, such as a distributed computing architecture. For example, the tracking component 402 can maintain a listing of one or more nodes (e.g., client devices or other nodes) that have been granted shared access to one or more data files. For example, the tracking component 402 can generate an ordered data structure that comprises respective identifications of a group of nodes granted a shared lock for a data file. The group of nodes can comprise a node having a respective identification of the respective identifications.

In an example, the tracking component 402 (or another component) can utilize one or more checkpoint Application Program Interfaces (API), which can be exclusive checkpoint APIs. The exclusive checkpoint APIs can be utilized in accordance with the disclosed aspects instead of an exclusive lock API.

The checkpoint API (e.g., via the transmitter/receiver component 410) can send a message to one or more client devices (not shown). At the client device, a message handler component can call a local checkpoint API. The local checkpoint API can provide a notification to the message handler component whether the checkpoint has been satisfied. If not satisfied (e.g., checkpoint has not completed), the message handler component waits and, after a defined interval, can perform another check as to whether the checkpoint has completed. Upon or after the checkpoint has completed, the checkpoint API can provide a notification of completion to the message handler component. Upon or after receiving the completion notification, the message handler component can respond to the message received from the checkpoint API (e.g., received from the device 400). The device 400 can receive the response via the transmitter/receiver component 410.

Upon or after the reply, the status manager component 404 can determine which node replied and an identifier of the node. For example, the status manager component 404 can determine that a checkpoint function associated with the shared lock has completed at a node of the group of nodes. Based on the node indicating that the checkpoint function has completed at the node, the removal component 406 can remove the identifier from the listing.

Further, the status manager component 404 can determine which nodes, if any, have not completed the checkpoint function. For example, there are three nodes in the group of nodes (e.g., a first node, a second node, and a third node). In this example, the status manager component can determine that a first identification of the first node, a second identification of the second node, and a third identification of the third node have been removed from the ordered data structure (e.g., the listing). Thus, the status manager component 404 can determine whether or not the data structure comprises null data. If there are no identifications of nodes remaining in the data structure, the removal component 406 (or another component) can remove the ordered data structure from a group of ordered data structures. For example, the group of ordered data structures can be utilized to track shared locks between checkpoint calls.

Further, the grant component 408 can facilitate access to the data file for a second group of nodes comprising second nodes based on receipt of respective shared lock requests from the second nodes. Thus, the respective shared lock requests from the second nodes do not block completion of a checkpoint call associated with the first group of nodes.

With continuing reference to the device 400, the at least one memory 412 can be operatively coupled to the at least one processor 414. The at least one memory 412 can store protocols associated with facilitating checkpoint locks for distributed systems as discussed herein. Further, the at least one memory 412 can facilitate actions to control communication between the device 400, other devices, and the one or more storage devices, such that the device 400 can employ stored protocols and/or algorithms to facilitate checkpoint locks for distributed systems as described herein.

It should be appreciated that data store components (e.g., the at least one memory 412) described herein can be either volatile memory, nonvolatile memory, or can include both volatile and nonvolatile memory. By way of example and not limitation, nonvolatile memory can include Read Only Memory (ROM), Programmable ROM (PROM), Electrically Programmable ROM (EPROM), Electrically Erasable ROM (EEPROM), or flash memory. Volatile memory can include RAM, which acts as external cache memory. By way of example and not limitation, RAM is available in many forms such as synchronous RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 414 can facilitate processing data related to facilitating checkpoint locks for distributed systems as discussed herein. The at least one processor 414 can be a processor dedicated to analyzing and/or generating information received, a processor that controls one or more components of the device 400, and/or a processor that both analyzes and generates information received and controls one or more components of the device 400.

Methods that can be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 5:
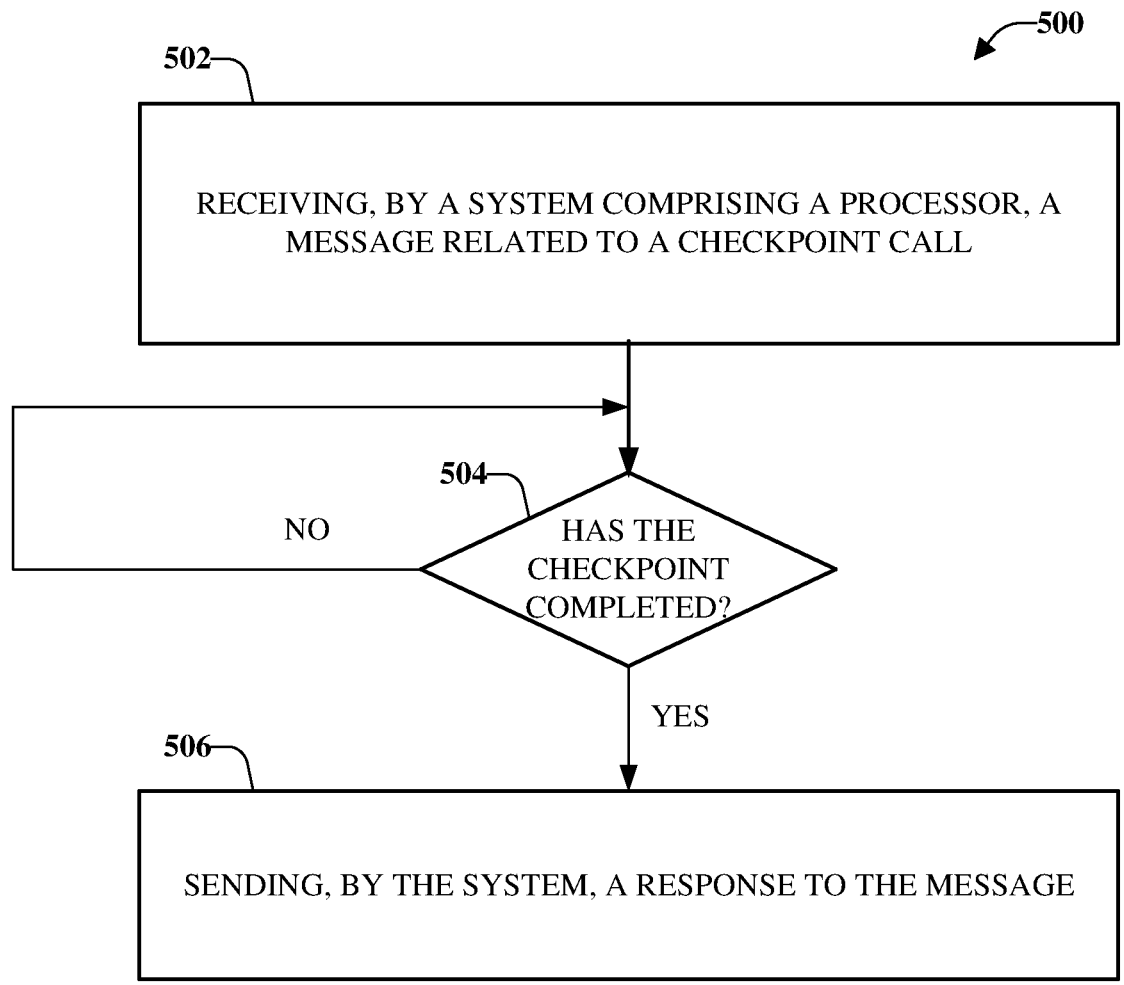
FIG. 5 illustrates a flow diagram of an example, non-limiting, computer-implemented method that facilitates checkpoint locks for distributed systems in accordance with one or more embodiments described herein.

FIG. 5 illustrates a flow diagram of an example, non-limiting, computer-implemented method 500 that facilitates checkpoint locks for distributed systems in accordance with one or more embodiments described herein.

In some implementations, a system comprising a processor can perform the computer-implemented method 500 and/or other methods discussed herein. In other implementations, a device comprising a processor can perform the computer-implemented method 500 and/or other methods discussed herein. For example, the device can be a node device in other implementations, a machine-readable storage medium, can comprise executable instructions that, when executed by a processor, facilitate performance of operations, which can be the operations discussed with respect to the computer-implemented method 500 and/or other methods discussed herein. In further implementations, a computer readable storage device comprising executable instructions that, in response to execution, cause a system comprising a processor to perform operations, which can be operations discussed with respect to the computer-implemented method 500 and/or other methods discussed herein.

At 502 of the computer-implemented method 500, a system comprising a processor can receive a message related to a checkpoint call. Upon or after receipt of the message, a local checkpoint API can be accessed, and a determination can be made, at 504 of the computer-implemented method 500, whether the checkpoint has completed. If the checkpoint has not completed ("NO"), the computer-implemented method 500 can return to 504 to make another determination whether the checkpoint has completed. The subsequent determinations at 504 can be made after a defined interval has passed since a previous determination. It is to be understood that the determination at 504 can be recursive. For example, the local checkpoint API can be accessed at various intervals to determine whether the checkpoint has completed.

If the determination at 504 is that the checkpoint has completed ("YES"), a response to the message can be sent, at 506 of the computer-implemented method 500. Accordingly, the listing can be updated to indicate that the checkpoint is completed.

Figure 6:
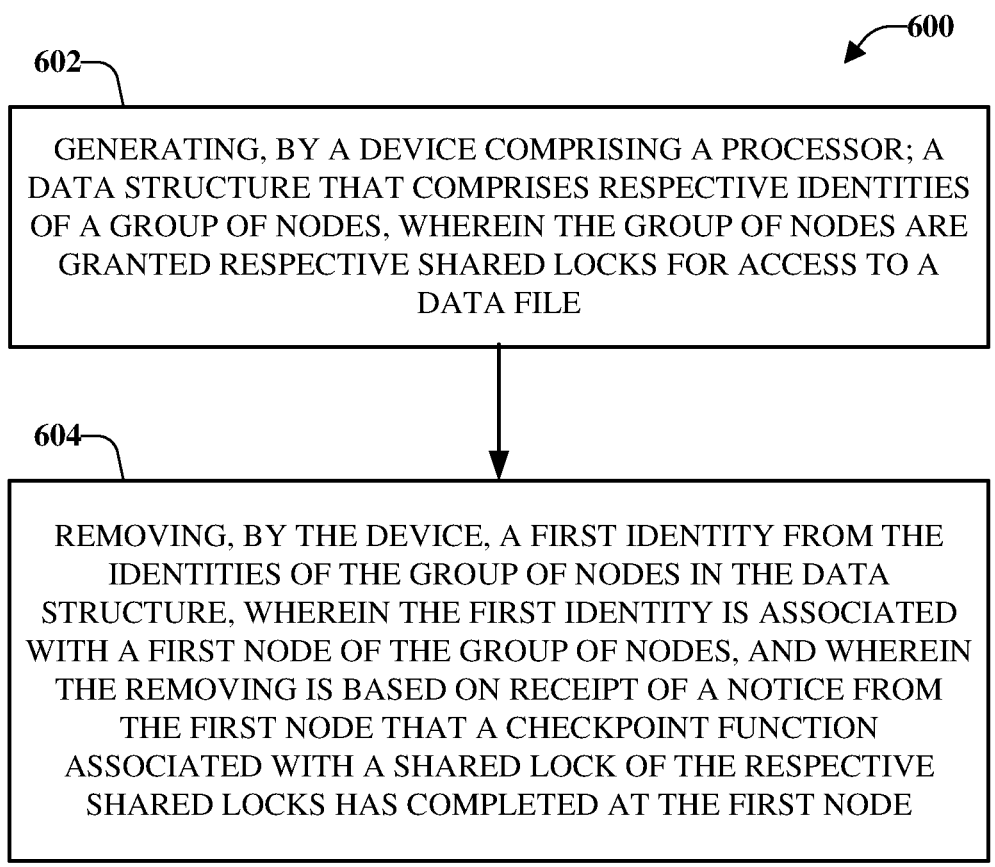
FIG. 6 illustrates a flow diagram of an example, non-limiting, computer-implemented method that facilitates checkpoint locks for managing lock resources in distributed systems in accordance with one or more embodiments described herein.

FIG. 6 illustrates a flow diagram of an example, non-limiting, computer-implemented method 600 that facilitates checkpoint locks for managing lock resources in distributed systems in accordance with one or more embodiments described herein.

In some implementations, a system comprising a processor can perform the computer-implemented method 600 and/or other methods discussed herein. In other implementations, a device comprising a processor can perform the computer-implemented method 600 and/or other methods discussed herein. For example, the device can be a node device. In other implementations, a machine-readable storage medium, can comprise executable instructions that, when executed by a processor, facilitate performance of operations, which can be the operations discussed with respect to the computer-implemented method 600 and/or other methods discussed herein. In further implementations, a computer readable storage device comprising executable instructions that, in response to execution, cause a system comprising a processor to perform operations, which can be operations discussed with respect to the computer-implemented method 600 and/or other methods discussed herein.

At 602 of the computer-implemented method 600, a device comprising a processor can generate a data structure that comprises respective identities of a group of nodes. The group of nodes can be granted respective shared locks for access to a data file.

Further, the device can remove a first identity from the identities of the group of nodes in the data structure, at 604 of the computer-implemented method 600. The first identity can be associated with a first node of the group of nodes. Removing the first identity can be based on receipt of a notice from the first node that a checkpoint function associated with a shared lock of the respective shared locks has completed at the first node. According to some implementations, the respective shared locks can comprise respective checkpoint application program interfaces.

In accordance with some implementations, the device can block the group of nodes from accessing the data file until respective notices are received from the group of nodes that respective checkpoint functions associated with the respective shared locks have completed at respective nodes of the group of nodes. For example, the device can block the group of nodes until all the nodes in the group of nodes have completed a checkpoint function.

In additional, or alternative, implementations, the device can allow another group of nodes access to the data file. The access can be allowed based on receipt of respective requests from the second group of nodes for second respective shared locks. The other group of nodes can include nodes that are different from the first group of nodes. However, according to some implementations, the other group of nodes can include nodes that are included in the first group of nodes. For example, nodes in the original group of nodes that completed a checkpoint function might be included in the other group of nodes.

Figure 7:
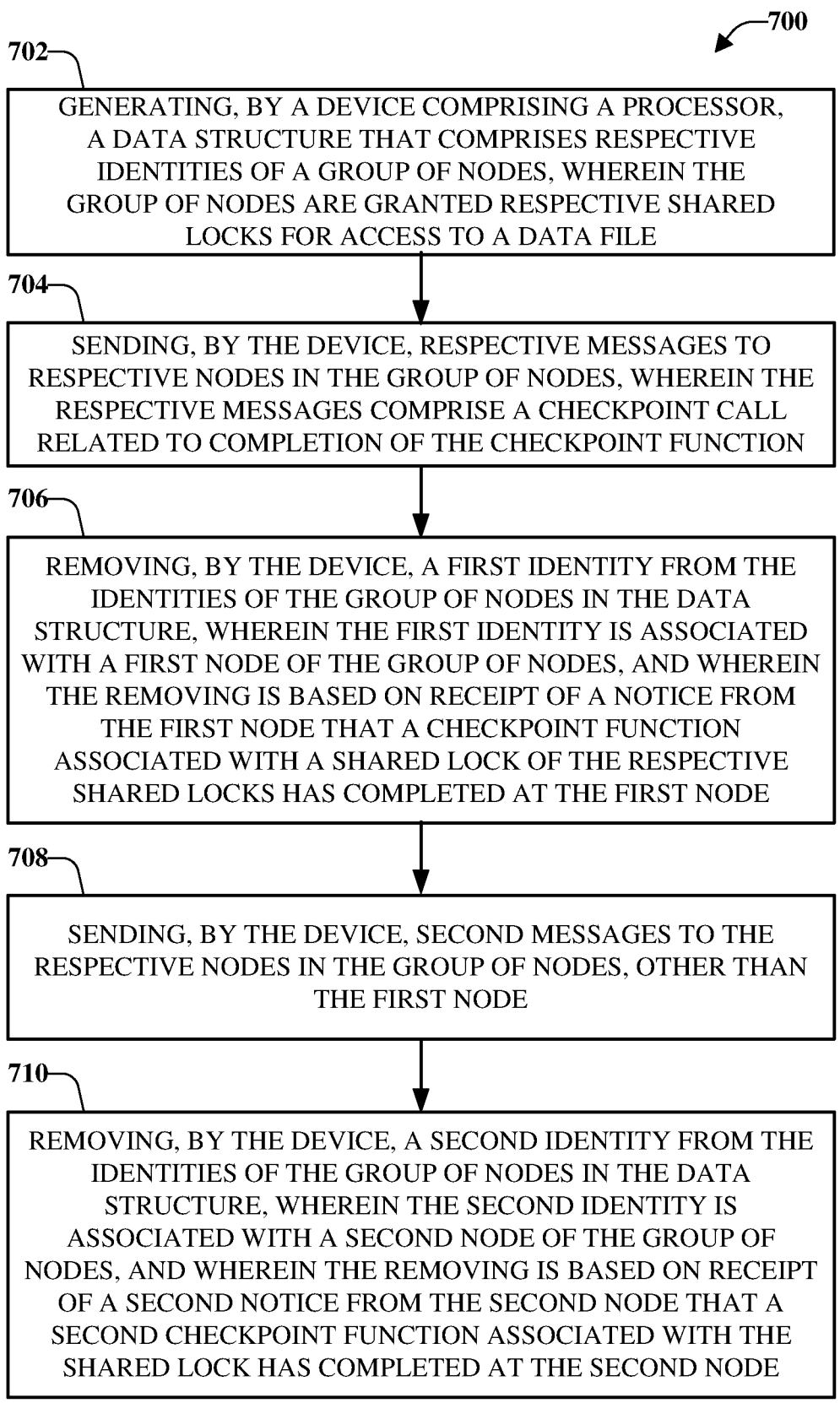
FIG. 7 illustrates a flow diagram of an example, non-limiting, computer-implemented method that facilitates tracking completion of checkpoint functions associated with locks in accordance with one or more embodiments described herein.

FIG. 7 illustrates a flow diagram of an example, non-limiting, computer-implemented method 700 that facilitates tracking completion of checkpoint functions associated with locks in accordance with one or more embodiments described herein.

In some implementations, a system comprising a processor can perform the computer-implemented method 700 and/or other methods discussed herein. In other implementations, a device comprising a processor can perform the computer-implemented method 700 and/or other methods discussed herein. For example, the device can be a node device. In other implementations, a machine-readable storage medium, can comprise executable instructions that, when executed by a processor, facilitate performance of operations, which can be the operations discussed with respect to the computer-implemented method 700 and/or other methods discussed herein. In further implementations, a computer readable storage device comprising executable instructions that, in response to execution, cause a system comprising a processor to perform operations, which can be operations discussed with respect to the computer-implemented method 700 and/or other methods discussed herein.

At 702 of the computer-implemented method 700 a device can generate a data structure that comprises respective identities of a group of nodes. The group of nodes can be nodes of a distributed computing environment. For example, a first node of the group of nodes can comprise a first identity (e.g., an identification), a second node of the group of nodes can comprise a second identity, and so on. Further, the group of nodes can be granted respective shared locks for access to a data file.

Respective first messages can be sent, by the device, to respective nodes in the group of nodes, at 704 of the computer-implemented method 700. For example, a broadcast message can be sent to all the nodes in the group of nodes. In another example, separate messages can be sent to the nodes, or a subset thereof. The respective messages can comprise a checkpoint call related to completion of the checkpoint function. For example, a first message sent to the first node can be a request for the first node to respond whether the checkpoint function has been completed (e.g., the node has received the updated data 304). In another example, the messages could indicate to only reply if the checkpoint function has completed at the node. However, the disclosed aspects are not limited to this implementation and one or more nodes could reply indicating that a checkpoint function has not been completed at that node.

Upon or after a node replies indicating that the checkpoint function is complete at the replying node (e.g., the first node in this example,), at 706 of the computer-implemented method 700, the device can remove a first identity from the identities of the group of nodes in the data structure. Thus, the device can remove the first identity based on receipt of a notice from the first node that a checkpoint function associated with a shared lock of the respective shared locks has completed at the first node.

Further, at 708 of the computer-implemented method 700, the device can send second messages to the respective nodes in the group of nodes. The second messages do not need to be sent to the first node, since the first node has already completed the checkpoint function.

In an example, a second notice can be received from the second node. The second notice can indicate that a second checkpoint function associated with the shared lock has completed at the second node. Accordingly, at 710 of the computer-implemented method 700, the device can remove a second identity from the identities of the group of nodes in the data structure. This process can continue until all nodes are removed from the data structure. Upon or after removal of all the nodes from the data structure, the data structure can be removed from a data structure listing.

Figure 8:
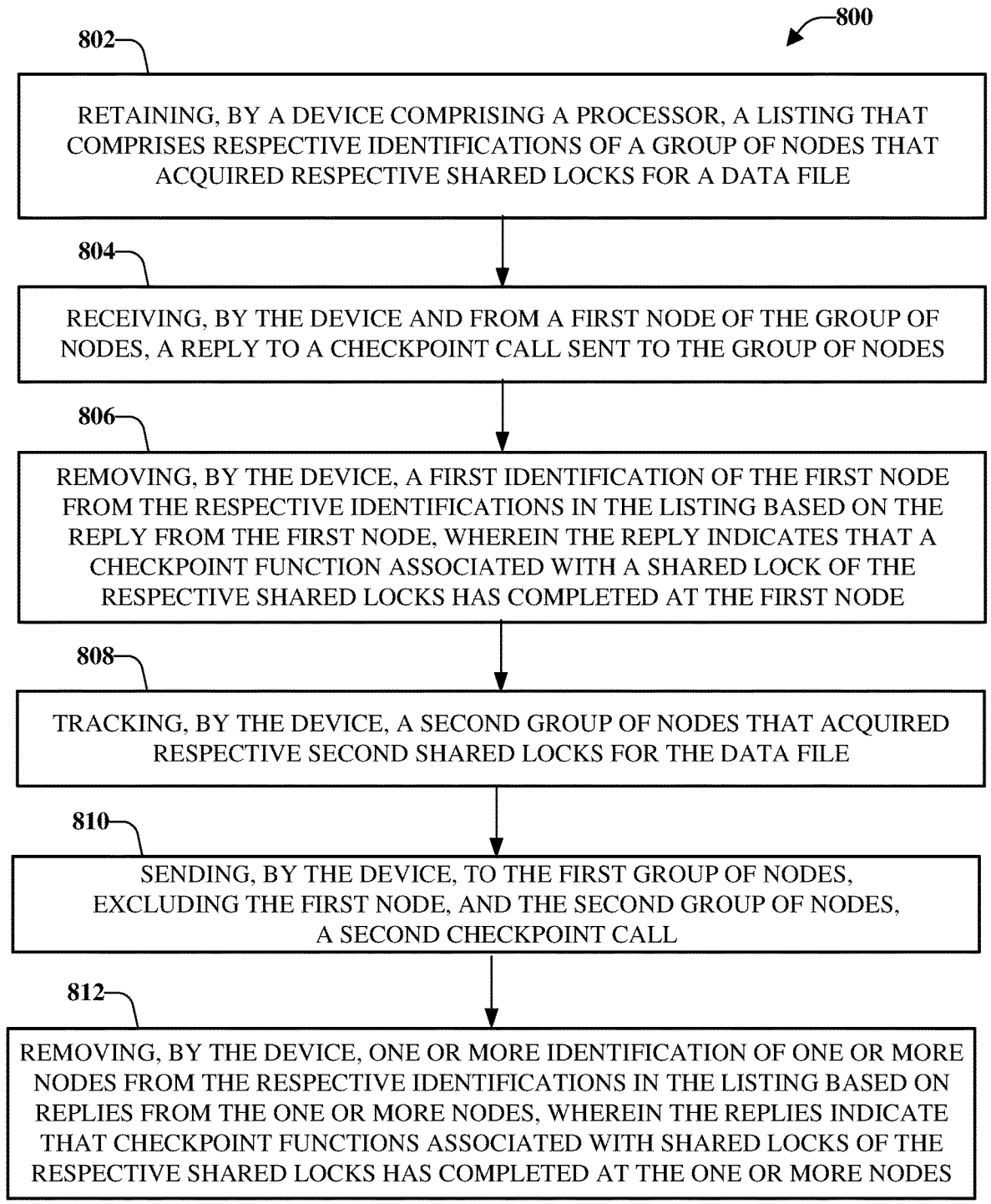
FIG. 8 illustrates a flow diagram of an example, non-limiting, computer-implemented method that facilitates tracking completion of checkpoint functions associated with locks in accordance with one or more embodiments described herein.

FIG. 8 illustrates a flow diagram of an example, non-limiting, computer-implemented method 800 that facilitates tracking completion of checkpoint functions associated with locks in accordance with one or more embodiments described herein. Repetitive description of like elements employed in other embodiments described herein is omitted for sake of brevity.

In some implementations, a system comprising a processor can perform the computer-implemented method 800 and/or other methods discussed herein. In other implementations, a device comprising a processor can perform the computer-implemented method 800 and/or other methods discussed herein. For example, the device can be a node device. In other implementations, a machine-readable storage medium, can comprise executable instructions that, when executed by a processor, facilitate performance of operations, which can be the operations discussed with respect to the computer-implemented method 800 and/or other methods discussed herein. In further implementations, a computer readable storage device comprising executable instructions that, in response to execution, cause a system comprising a processor to perform operations, which can be operations discussed with respect to the computer-implemented method 800 and/or other methods discussed herein.

At 802 of the computer-implemented method 800 a device can retain a listing that comprises respective identifications of a group of nodes that acquired respective shared locks for a data file. Further, at 804 the device can receive, from a first node of the group of nodes, a reply to a checkpoint call sent to the group of nodes. A first identification of the first node can be removed, by the device, from the respective identifications in the listing, at 806 of the computer-implemented method 800. The device can remove the first identification of the first node based on the reply from the first node. For example, the response can indicate that a checkpoint function associated with a shared lock of the respective shared locks has completed at the first node.

Further, at 808, the device can track another group of nodes that acquired respective second shared locks for the data file. The device can send to the first group of nodes, excluding the first node, and the second group of nodes, a second checkpoint call, at 810 of the computer-implemented method 800.

One or more identifications of one or more nodes can be removed, by the device from the respective identifications, at 812 of the computer-implemented method 800. Removal of the one or more identifications can be based on receiving replies from the one or more nodes that indicate checkpoint functions associated with shared locks of the respective shared locks has completed at the one or more nodes.

If there are still nodes that have not replied, indicating that checkpoint functions have not completed at the nodes, another checkpoint call can be sent. Any number of checkpoint calls can be sent until all nodes have replied, indicating that all checkpoint functions are completed.

Figure 9:
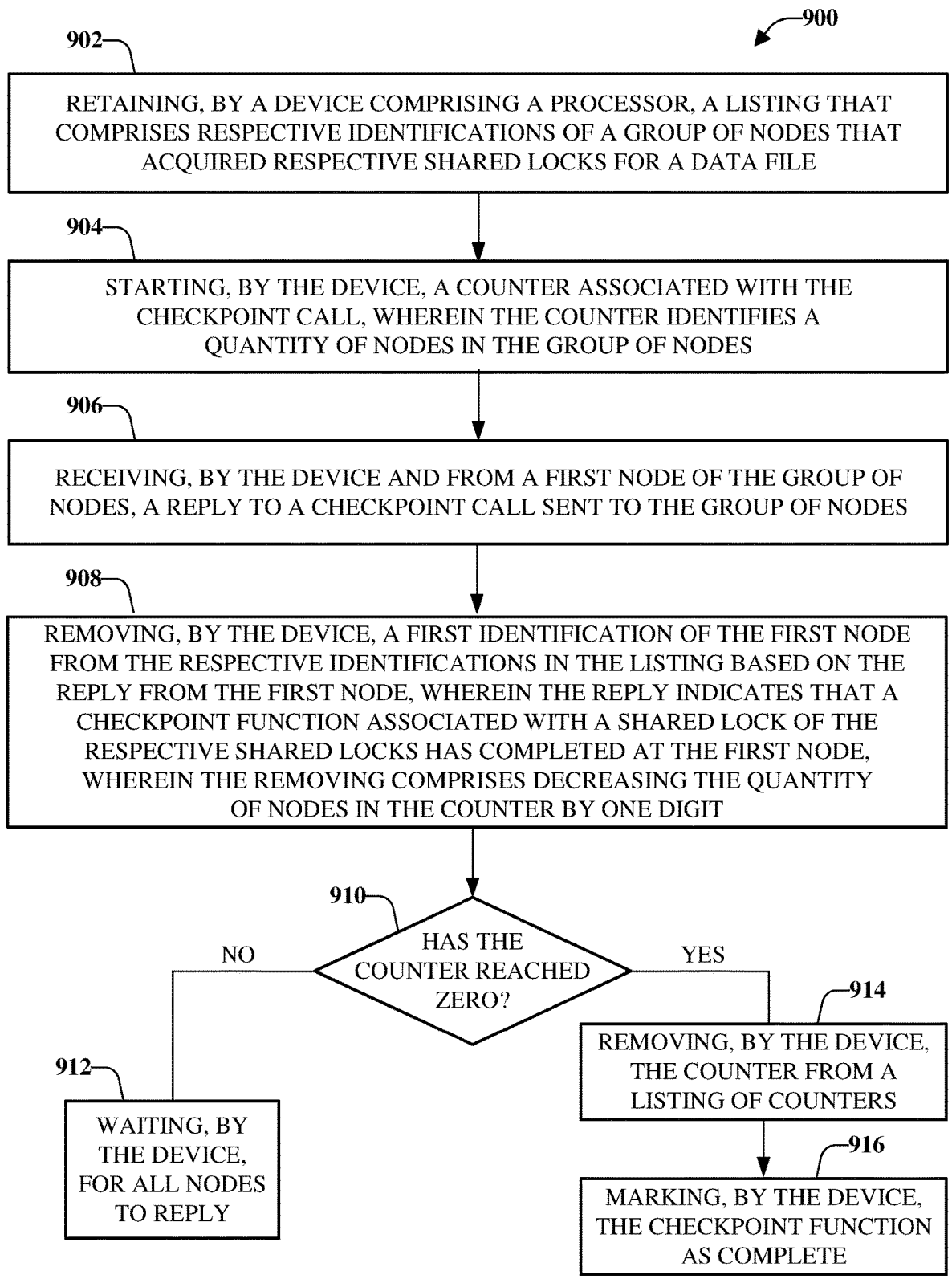
FIG. 9 illustrates a flow diagram of an example, non-limiting, computer-implemented method that facilitates completing checkpoint function calls related to facilitating checkpoint locks for distributed systems in accordance with one or more embodiments described herein.

FIG. 9 illustrates a flow diagram of an example, non-limiting, computer-implemented method 900 that facilitates completing checkpoint function calls related to facilitating checkpoint locks for distributed systems in accordance with one or more embodiments described herein. Repetitive description of like elements employed in other embodiments described herein is omitted for sake of brevity.

In some implementations, a system comprising a processor can perform the computer-implemented method 900 and/or other methods discussed herein. In other implementations, a device comprising a processor can perform the computer-implemented method 900 and/or other methods discussed herein. For example, the device can be a node device. In other implementations, a machine-readable storage medium, can comprise executable instructions that, when executed by a processor, facilitate performance of operations, which can be the operations discussed with respect to the computer-implemented method 900 and/or other methods discussed herein. In further implementations, a computer readable storage device comprising executable instructions that, in response to execution, cause a system comprising a processor to perform operations, which can be operations discussed with respect to the computer-implemented method 900 and/or other methods discussed herein.

At 902 of the computer-implemented method 900, a device comprising a processor can retain a listing that comprises respective identifications of a group of nodes that acquired respective shared locks for a data file. Further, the device can start a counter associated with the checkpoint call, at 904 of the computer-implemented method 900. The counter can identify a quantity of nodes in the group of nodes.

Further, at 906 of the computer-implemented method 900, the device can receive, from a first node of the group of nodes, a reply to a checkpoint call sent to the group of nodes. The device can remove a first identification of the first node from the respective identifications in the listing, at 908 of the computer-implemented method 900. Removal of the first identification can be based on the reply from the first node. Further, the reply can indicate that a checkpoint function associated with a shared lock of the respective shared locks has completed at the first node. According to some implementations, removing the first identification can include decreasing the quantity of nodes in the counter by one digit.

Further, at 910 of the computer-implemented method 900, the device can make a determination whether the counter has reached zero. For example, more than one node can reply, at 906, or after subsequent requests for checkpoint calls. Accordingly, identifications of the nodes that provide a reply indicating that their respective checkpoint functions have completed can be removed, at 908.

If the determination, at 910, is that the counter has not reached zero ("NO"), the computer-implemented method 900 can continue, at 912, and the device can wait for all nodes to reply. As nodes reply, their identities can be removed from the listing.

If the determination, at 910, is that the counter has reached zero ("YES"), at 914, the counter can be removed from a listing of counters. Further, at 916, the checkpoint function can be marked as complete.

As used herein, the term "storage device," "first storage device," "storage cluster nodes," "storage system," and the like, can include, for example, private or public cloud computing systems for storing data as well as systems for storing data comprising virtual infrastructure and those not comprising virtual infrastructure. The term "I/O request" (or simply "I/O") can refer to a request to read and/or write data.

The term "cloud" as used herein can refer to a cluster of nodes (e.g., set of network servers), for example, within a distributed object storage system, that are communicatively and/or operatively coupled to one another, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with one another to provide resources for end-users.

Further, the term "storage device" can refer to any Non-Volatile Memory (NVM) device, including Hard Disk Drives (HDDs), flash devices (e.g., NAND flash devices), and next generation NVM devices, any of which can be accessed locally and/or remotely (e.g., via a Storage Attached Network (SAN)). In some embodiments, the term "storage device" can also refer to a storage array comprising one or more storage devices. In various embodiments, the term "object" refers to an arbitrary-sized collection of user data that can be stored across one or more storage devices and accessed using I/O requests.

Further, a storage cluster can include one or more storage devices. For example, a distributed storage system can include one or more clients in communication with a storage cluster via a network. The network can include various types of communication networks or combinations thereof including, but not limited to, networks using protocols such as Ethernet, Internet Small Computer System Interface (iSCSI), Fibre Channel (FC), and/or wireless protocols. The clients can include user applications, application servers, data management tools, and/or testing systems.

As utilized herein an "entity," "client," "user," and/or "application" can refer to any system or person that can send I/O requests to a storage system. For example, an entity, can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as an entity or entities depending on the context.

Figure 10:
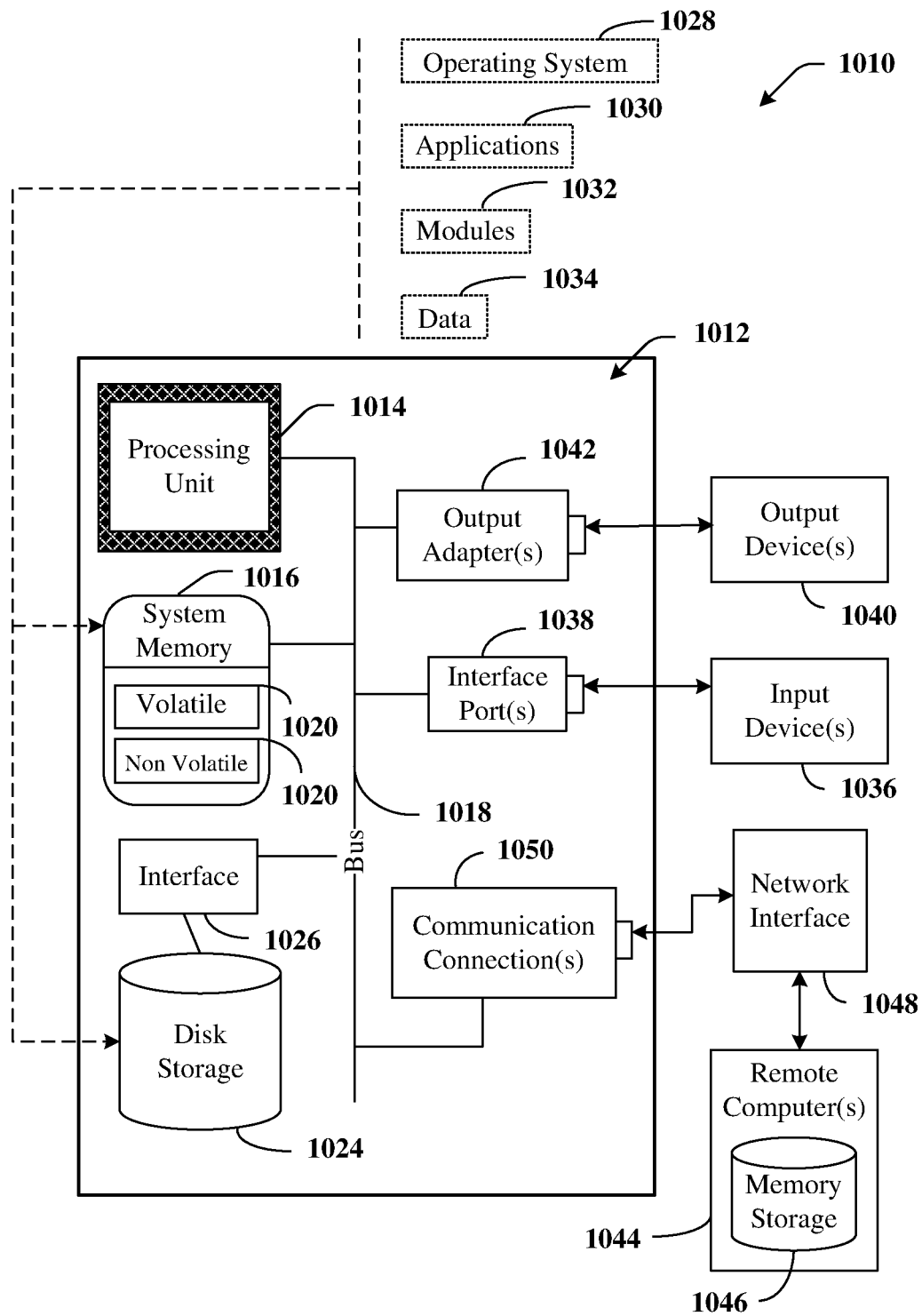
FIG. 10 illustrates an example, non-limiting, computing environment in which one or more embodiments described herein can be facilitated.

In order to provide a context for the various aspects of the disclosed subject matter, FIG. 10 as well as the following discussion are intended to provide a brief, general description of a suitable environment in which the various aspects of the disclosed subject matter can be implemented.

With reference to FIG. 10, an example environment 1010 for implementing various aspects of the aforementioned subject matter comprises a computer 1012. The computer 1012 comprises a processing unit 1014, a system memory 1016, and a system bus 1018. The system bus 1018 couples system components including, but not limited to, the system memory 1016 to the processing unit 1014. The processing unit 1014 can be any of various available processors. Multi-core microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 comprises volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can comprise read only memory (ROM), programmable ROM (PROM), electrically programmable ROM (EPROM), electrically erasable PROM (EEPROM), or flash memory. Volatile memory 1020 comprises random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also comprises removable/non-removable, volatile/non-volatile computer storage media. FIG. 10 illustrates, for example a disk storage 1024. Disk storage 1024 comprises, but is not limited to, devices like a magnetic disk drive, floppy disk drive, tape drive, Jaz drive, Zip drive, LS-100 drive, flash memory card, or memory stick. In addition, disk storage 1024 can comprise storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software comprises an operating system 1028. Operating system 1028, which can be stored on disk storage 1024, acts to control and allocate resources of the computer 1012. System applications 1030 take advantage of the management of resources by operating system 1028 through program modules 1032 and program data 1034 stored either in system memory 1016 or on disk storage 1024. It is to be appreciated that one or more embodiments of the subject disclosure can be implemented with various operating systems or combinations of operating systems.

A user enters commands or information into the computer 1012 through input device(s) 1036. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 comprise, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapters 1042 are provided to illustrate that there are some output devices 1040 like monitors, speakers, and printers, among other output devices 1040, which require special adapters. The output adapters 1042 comprise, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically comprises many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies comprise Fiber Distributed Data Interface (FDDI), Copper Distributed Data Interface (CDDI), Ethernet/IEEE 802.3, Token Ring/IEEE 802.5 and the like. WAN technologies comprise, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the system bus 1018. While communication connection 1050 is shown for illustrative clarity inside computer 1012, it can also be external to computer 1012. The hardware/software necessary for connection to the network interface 1048 comprises, for exemplary purposes only, internal and external technologies such as, modems including regular telephone grade modems, cable modems and DSL modems, ISDN adapters, and Ethernet cards.

Figure 11:
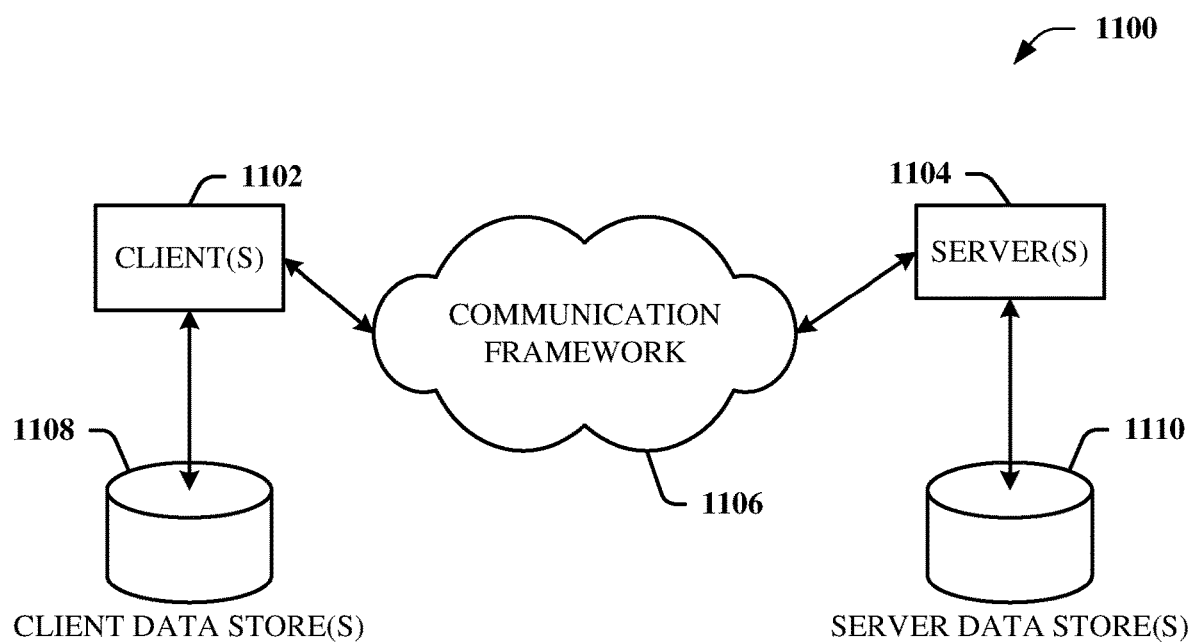
FIG. 11 illustrates an example, non-limiting, networking environment in which one or more embodiments described herein can be facilitated.

FIG. 11 is a schematic block diagram of a sample computing environment 1100 with which the disclosed subject matter can interact. The sample computing environment 1100 includes one or more client(s) 1102. The client(s) 1102 can be hardware and/or software (e.g., threads, processes, computing devices). The sample computing environment 1100 also includes one or more server(s) 1104. The server(s) 1104 can also be hardware and/or software (e.g., threads, processes, computing devices). The servers 1104 can house threads to perform transformations by employing one or more embodiments as described herein, for example. One possible communication between a client 1102 and servers 1104 can be in the form of a data packet adapted to be transmitted between two or more computer processes. The sample computing environment 1100 includes a communication framework 1106 that can be employed to facilitate communications between the client(s) 1102 and the server(s) 1104. The client(s) 1102 are operably connected to one or more client data store(s) 1108 that can be employed to store information local to the client(s) 1102. Similarly, the server(s) 1104 are operably connected to one or more server data store(s) 1110 that can be employed to store information local to the servers 1104.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable storage media can comprise, but are not limited to, radon access memory (RAM), read only memory (ROM), electrically erasable programmable read only memory (EEPROM), flash memory or other memory technology, solid state drive (SSD) or other solid-state storage technology, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

Disclosed embodiments and/or aspects should neither be presumed to be exclusive of other disclosed embodiments and/or aspects, nor should a device and/or structure be presumed to be exclusive to its depicted element in an example embodiment or embodiments of this disclosure, unless where clear from context to the contrary. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of elements (or embodiments) into a single device achieving aggregate functionality, where suitable, or distribution of functionality of a single device into multiple device, where suitable. In addition, incorporation, combination or modification of devices or elements (e.g., components) depicted herein or modified as stated above with devices, structures, or subsets thereof not explicitly depicted herein but known in the art or made evident to one with ordinary skill in the art through the context disclosed herein are also considered within the scope of the present disclosure.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
    a processor; and
    a memory that stores executable instructions that, when executed by the processor, facilitate performance of operations, comprising:
        retaining a listing that comprises respective identifications of a group of nodes that acquired respective shared locks between a defined pair of checkpoint calls for a data file, wherein the shared locks are electronic read locks and electronic write locks for the data file, and wherein the group of nodes are arranged in a distributed computing hierarchy;
        receiving, from a first node of the group of nodes, a reply to a first checkpoint call sent to the group of nodes, wherein the first checkpoint call is one checkpoint call of the defined pair of checkpoint calls or another checkpoint call between the defined pair of checkpoint calls; and
        removing a first identification of the first node from the respective identifications in the listing based on the reply from the first node, wherein the reply indicates that a checkpoint function associated with a shared lock of the respective shared locks has completed at the first node,
    wherein the operations further comprise, prior to the receiving the reply, starting a counter associated with the first checkpoint call, wherein the counter identifies a quantity of nodes in the group of nodes, and wherein the removing the first identification of the first node comprises decreasing the quantity of nodes by one digit.

2. The system of claim 1, wherein the group of nodes is a first group of nodes, wherein the respective shared locks are respective first shared locks, and wherein the operations further comprise:
    tracking a second group of nodes that acquired respective second shared locks for the data file; and
    sending to the first group of nodes, excluding the first node, and the second group of nodes, a second checkpoint call.

3. The system of claim 1, wherein the operations further comprise:
    determining that the counter has reached zero;
    removing the counter from a listing of counters; and
    marking the checkpoint function as complete.

4. The system of claim 1, wherein the respective shared locks comprise respective checkpoint application program interfaces.

5. The system of claim 4, wherein the respective checkpoint application program interfaces are configured to send messages to nodes of the group of nodes based on issuance of a checkpoint call.

6. The system of claim 1, wherein the group of nodes is part of a distributed computing environment.

7. The system of claim 1, further comprising a stack memory, wherein the counter is incremented in the stack memory.

8. A non-transitory machine-readable medium, comprising executable instructions that, when executed by a processor, facilitate performance of operations, comprising:
retaining a data structure that comprises respective identifications of a group of nodes that acquired respective shared locks for a data file between a defined pair of checkpoint functions, wherein the respective shared locks are electronic read locks and electronic write locks for the data file, and wherein the group of nodes are arranged in a distributed computing hierarchy;
receiving, from a first node of the group of nodes, a reply to a first checkpoint function sent to the group of nodes, wherein the first checkpoint function is one checkpoint function of the defined pair of checkpoint functions or another checkpoint function between the defined pair of checkpoint functions; and
wherein the operations further comprise, prior to the receiving the reply, starting a counter associated with the first checkpoint function, wherein the counter identifies a quantity of nodes in the group of nodes, and wherein the removing the first identification of the first node comprises decreasing the quantity of nodes by one digit.

9. The non-transitory machine-readable medium of claim 8, wherein the operations further comprise:
prior to the removing, sending to the group of nodes a checkpoint call, wherein the information indicative of completion of the first checkpoint function is based on the checkpoint call.

10. The non-transitory machine-readable medium of claim 9, wherein the group of nodes is a first group of nodes, wherein the respective shared locks are respective first shared locks, and wherein the operations further comprise:
tracking a second group of nodes that acquired respective second shared locks for the data file; and
sending to the first group of nodes, excluding the first node, and the second group of nodes, a second checkpoint call.

11. The non-transitory machine-readable medium of claim 10, wherein the operations further comprise:
based on a determination that the counter has reached zero, removing the counter from a listing of counters; and
indicating that the first checkpoint function is complete.

12. The non-transitory machine-readable medium of claim 8, wherein the respective shared locks comprise respective checkpoint application program interfaces.

13. The non-transitory machine-readable medium of claim 12, wherein the respective checkpoint application program interfaces are configured to send messages to the nodes of the group of nodes based on issuance of a checkpoint call.

14. The non-transitory machine-readable medium of claim 8, wherein respective shared lock requests from other nodes of the group of nodes do not block completion of a checkpoint call associated with the first node.

15. The non-transitory machine-readable medium of claim 8, wherein the respective shared locks are checkpoint application program interfaces.

16. A method, comprising:
retaining, by a device comprising a processor, a listing that comprises respective identifications of a group of nodes that acquired respective shared locks for a data file between a defined pair of checkpoint calls, wherein the shared locks are electronic read locks and electronic write locks for the data file, and wherein the group of nodes are arranged in a distributed computing hierarchy;
receiving, by the device and from a first node of the group of nodes, a reply to a first checkpoint call sent to the group of nodes, wherein the first checkpoint call is one checkpoint call of the defined pair of checkpoint calls or another checkpoint call between the defined pair of checkpoint calls; and
removing, by the device, a first identification of the first node from the respective identifications in the listing based on the reply from the first node, wherein the reply indicates that a checkpoint function associated with a shared lock of the respective shared locks has completed at the first node,
wherein the method further comprises, prior to the receiving the reply, starting, by the device, a counter associated with the first checkpoint call, wherein the counter identifies a quantity of nodes in the group of nodes, and wherein the removing the first identification of the first node comprises decreasing the quantity of nodes by one digit.

17. The method of claim 16, wherein the group of nodes is a first group of nodes, wherein the respective shared locks are respective first shared locks, and wherein the method further comprises:
tracking, by the device, a second group of nodes that acquired respective second shared locks for the data file; and
sending, by the device, to the first group of nodes, excluding the first node, and the second group of nodes, a second checkpoint call.

18. The method of claim 16, further comprising:
determining, by the device, that the counter has reached zero;
removing, by the device, the counter from a listing of counters; and
indicating, by the device, that the checkpoint function as complete.

19. The method of claim 16, wherein the respective shared locks comprise respective checkpoint application program interfaces.

20. The method of claim 19, wherein the respective checkpoint application program interfaces are configured to send messages to nodes of the group of nodes based on issuance of a checkpoint call.

* * * * *